US009628587B2

(12) United States Patent
Chastain et al.

(10) Patent No.: US 9,628,587 B2
(45) Date of Patent: *Apr. 18, 2017

(54) APPARATUS AND METHOD FOR SECURE OVER THE AIR PROGRAMMING OF A COMMUNICATION DEVICE

(71) Applicant: AT&T INTELLECTUAL PROPERTY I, LP, Atlanta, GA (US)

(72) Inventors: Walter Cooper Chastain, Atlanta, GA (US); Stephen Emille Chin, Marietta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/937,398

(22) Filed: Nov. 10, 2015

(65) Prior Publication Data

US 2016/0065695 A1 Mar. 3, 2016

Related U.S. Application Data

(63) Continuation of application No. 14/069,908, filed on Nov. 1, 2013, now Pat. No. 9,240,989.

(51) Int. Cl.
*H04L 29/06* (2006.01)
*H04W 12/06* (2009.01)
(Continued)

(52) U.S. Cl.
CPC ............... *H04L 69/08* (2013.01); *G06F 8/65* (2013.01); *H04L 51/066* (2013.01); *H04L 51/38* (2013.01);
(Continued)

(58) Field of Classification Search
CPC ..... H04L 67/42; H04L 69/08; H04L 63/0428; H04L 63/08; H04W 4/18; H04W 12/06; G06F 21/72; G06F 21/77
See application file for complete search history.

(56) References Cited

U.S. PATENT DOCUMENTS 5,742,910 A 4/1998 Gallant et al.
5,774,544 A 6/1998 Lee et al.
(Continued)

FOREIGN PATENT DOCUMENTS

AU 2010315111 A1 6/2012
CA 2823685 A1 2/2012
(Continued)

OTHER PUBLICATIONS

"Over-The-Air Platform Security Review", Mandiant Intelligent Information Security, 6 pgs., Aug. 17, 2010.
(Continued)

*Primary Examiner* — Robert Leung
(74) *Attorney, Agent, or Firm* — Guntin & Gust, PLC; Jay H. Anderson

(57) ABSTRACT

A system that incorporates the subject disclosure may perform, for example, receiving an over-the-air programming message that is utilizing a hypertext transfer protocol where the over-the-air programming message including programming data for use by the mobile communication device, converting the over-the-air programming message to a short message service transport protocol to generate an adjusted message that includes the programming data, and providing the adjusted message to a universal integrated circuit card of the mobile communication device via a baseband proxy operating in a device processor of the mobile communication device. Other embodiments are disclosed.

20 Claims, 9 Drawing Sheets

(51) Int. Cl.
*H04W 4/00* (2009.01)
*H04W 4/14* (2009.01)
*G06F 9/445* (2006.01)
*H04L 12/58* (2006.01)
*H04W 4/18* (2009.01)
*G06F 21/77* (2013.01)
*G06F 21/72* (2013.01)

(52) U.S. Cl.
CPC ...... *H04L 63/0428* (2013.01); *H04L 63/0471* (2013.01); *H04L 63/08* (2013.01); *H04L 67/42* (2013.01); *H04W 4/001* (2013.01); *H04W 4/14* (2013.01); *H04W 4/18* (2013.01); *H04W 12/06* (2013.01); *G06F 21/72* (2013.01); *G06F 21/77* (2013.01)

(56) References Cited

U.S. PATENT DOCUMENTS

| | | |
|---|---|---|
| 6,005,942 A | 12/1999 | Chan et al. |
| 6,014,561 A | 1/2000 | Moelne |
| 6,151,677 A | 11/2000 | Walter et al. |
| 6,892,301 B1 | 5/2005 | Hansmann et al. |
| 6,922,200 B1 | 7/2005 | Marques et al. |
| 7,165,173 B1 | 1/2007 | Herle |
| 7,185,362 B2 | 2/2007 | Hawkes et al. |
| 7,239,704 B1 | 7/2007 | Maillard et al. |
| 7,257,844 B2 | 8/2007 | Woodward et al. |
| 7,269,732 B2 | 9/2007 | Kilian-Kehr |
| 7,382,881 B2 | 6/2008 | Uusitalo et al. |
| 7,454,233 B2 | 11/2008 | Lu et al. |
| 7,472,123 B2 | 12/2008 | Hamatsu |
| 7,480,907 B1 | 1/2009 | Marolia et al. |
| 7,499,960 B2 | 3/2009 | Dageville et al. |
| 7,606,560 B2 | 10/2009 | Labrou et al. |
| 7,715,823 B2 | 5/2010 | Bravo et al. |
| 7,751,567 B2 | 7/2010 | Quick, Jr. et al. |
| 7,917,751 B2 | 3/2011 | Keohane et al. |
| 8,032,756 B2 | 10/2011 | Inami |
| 8,064,598 B2 | 11/2011 | Vaha-Sipila et al. |
| 8,098,818 B2 | 1/2012 | Grilli et al. |
| 8,165,635 B2 | 4/2012 | Khan et al. |
| 8,166,524 B2 | 4/2012 | Sentinelli |
| 8,213,612 B2 | 7/2012 | Kaabouch et al. |
| 8,244,181 B2 | 8/2012 | Shuo |
| 8,271,025 B2 | 9/2012 | Brisebois et al. |
| 8,333,321 B2 | 12/2012 | Gressel et al. |
| 8,346,287 B2 | 1/2013 | King et al. |
| 8,380,171 B2 | 2/2013 | Link et al. |
| 8,387,119 B2 | 2/2013 | Patel et al. |
| 8,391,837 B2 | 3/2013 | Corda |
| 8,406,758 B2 | 3/2013 | Snijder et al. |
| 8,417,952 B2 | 4/2013 | Cheng et al. |
| 8,494,908 B2 | 7/2013 | Herwig et al. |
| 8,503,376 B2 | 8/2013 | Cha et al. |
| 8,505,085 B2 | 8/2013 | Logan et al. |
| 8,510,559 B2 | 8/2013 | Guccione et al. |
| 8,533,803 B2 | 9/2013 | Cha et al. |
| 8,738,898 B2 | 5/2014 | Herwono et al. |
| 8,776,189 B2 | 7/2014 | Jain |
| 8,799,932 B2* | 8/2014 | Prevost ............... G06F 9/541 719/330 |
| 8,814,051 B2 | 8/2014 | Millet et al. |
| 8,837,449 B2 | 9/2014 | Chen et al. |
| 9,301,145 B2 | 3/2016 | Merrien et al. |
| 2001/0029581 A1 | 10/2001 | Knauft et al. |
| 2002/0040936 A1 | 4/2002 | Wentker et al. |
| 2003/0129965 A1 | 7/2003 | Siegel |
| 2003/0186722 A1 | 10/2003 | Weiner |
| 2004/0240671 A1 | 12/2004 | Hu et al. |
| 2005/0002407 A1 | 1/2005 | Shaheen et al. |
| 2005/0202803 A1 | 9/2005 | Mahalal |
| 2005/0278787 A1 | 12/2005 | Naslund et al. |
| 2006/0079284 A1 | 4/2006 | Lu et al. |
| 2006/0130128 A1 | 6/2006 | Gorancic et al. |
| 2006/0165060 A1 | 7/2006 | Dua |
| 2006/0205387 A1 | 9/2006 | Laitinen et al. |
| 2006/0206710 A1 | 9/2006 | Gehrmann |
| 2006/0242064 A1 | 10/2006 | Jogand-Coulomb et al. |
| 2006/0269061 A1 | 11/2006 | Balasubramanian et al. |
| 2006/0289659 A1 | 12/2006 | Mizushima et al. |
| 2007/0050365 A1 | 3/2007 | Laitinen et al. |
| 2007/0101122 A1 | 5/2007 | Guo |
| 2007/0239857 A1* | 10/2007 | Mahalal ............... H04L 63/083 709/219 |
| 2007/0294744 A1 | 12/2007 | Alessio et al. |
| 2008/0005559 A1 | 1/2008 | Johnson |
| 2008/0010470 A1 | 1/2008 | McKeon et al. |
| 2008/0155257 A1 | 6/2008 | Werner et al. |
| 2008/0301433 A1 | 12/2008 | Vito |
| 2008/0304458 A1 | 12/2008 | Aghvami et al. |
| 2009/0077643 A1 | 3/2009 | Schmidt et al. |
| 2009/0116642 A1 | 5/2009 | Yang |
| 2009/0163235 A1 | 6/2009 | Michaels et al. |
| 2009/0191857 A1 | 7/2009 | Horn et al. |
| 2009/0220091 A1 | 9/2009 | Howard |
| 2009/0288012 A1 | 11/2009 | Hertel et al. |
| 2009/0327138 A1 | 12/2009 | Mardani et al. |
| 2010/0037230 A1 | 2/2010 | Potonniee et al. |
| 2010/0048169 A1 | 2/2010 | Yan et al. |
| 2010/0062808 A1 | 3/2010 | Cha et al. |
| 2010/0281251 A1 | 11/2010 | Arauz Rosado |
| 2010/0299731 A1 | 11/2010 | Atkinson |
| 2010/0306531 A1 | 12/2010 | Nahari |
| 2010/0315346 A1 | 12/2010 | Lindroos et al. |
| 2011/0007899 A1 | 1/2011 | Park et al. |
| 2011/0035584 A1 | 2/2011 | Meyerstein et al. |
| 2011/0191597 A1 | 8/2011 | Grall et al. |
| 2011/0208600 A1 | 8/2011 | Aharoni et al. |
| 2011/0211699 A1 | 9/2011 | Ma et al. |
| 2011/0265159 A1 | 10/2011 | Ronda et al. |
| 2011/0296182 A1 | 12/2011 | Jia et al. |
| 2011/0302017 A1 | 12/2011 | Marti et al. |
| 2011/0302408 A1 | 12/2011 | McDermott et al. |
| 2012/0027209 A1 | 2/2012 | Aissi et al. |
| 2012/0028609 A1 | 2/2012 | Hruska |
| 2012/0036042 A1 | 2/2012 | Graylin et al. |
| 2012/0047563 A1 | 2/2012 | Wheeler et al. |
| 2012/0072979 A1 | 3/2012 | Cha et al. |
| 2012/0108205 A1 | 5/2012 | Schell et al. |
| 2012/0108213 A1* | 5/2012 | Kasargod ............... H04W 4/00 455/412.1 |
| 2012/0130838 A1 | 5/2012 | Koh et al. |
| 2012/0142332 A1 | 6/2012 | Li |
| 2012/0144201 A1 | 6/2012 | Anantha et al. |
| 2012/0159163 A1 | 6/2012 | von Behren et al. |
| 2012/0172089 A1 | 7/2012 | Bae et al. |
| 2012/0185661 A1 | 7/2012 | Desai et al. |
| 2012/0187184 A1 | 7/2012 | Challa et al. |
| 2012/0190354 A1 | 7/2012 | Merrien et al. |
| 2012/0208597 A1 | 8/2012 | Billman |
| 2012/0233685 A1 | 9/2012 | Palanigounder et al. |
| 2012/0246476 A1 | 9/2012 | Zhuang et al. |
| 2012/0259849 A1 | 10/2012 | Deodhar et al. |
| 2012/0266220 A1 | 10/2012 | Brudnicki et al. |
| 2012/0311563 A1 | 12/2012 | Lee et al. |
| 2012/0317261 A1 | 12/2012 | Ahmavaara et al. |
| 2013/0012168 A1 | 1/2013 | Rajadurai et al. |
| 2013/0023235 A1 | 1/2013 | Fan et al. |
| 2013/0024383 A1 | 1/2013 | Kannappan et al. |
| 2013/0041830 A1 | 2/2013 | Singh et al. |
| 2013/0067232 A1 | 3/2013 | Cheung et al. |
| 2013/0074163 A1 | 3/2013 | Murakami et al. |
| 2013/0145455 A1 | 6/2013 | Vijayshankar et al. |
| 2013/0152208 A1 | 6/2013 | King et al. |
| 2013/0166595 A1 | 6/2013 | Meketa et al. |
| 2013/0173759 A1 | 7/2013 | Herse et al. |
| 2013/0203465 A1 | 8/2013 | Ali et al. |
| 2013/0262317 A1 | 10/2013 | Collinge et al. |
| 2013/0272714 A1 | 10/2013 | Ohkubo |
| 2013/0291084 A1 | 10/2013 | Amiel et al. |
| 2013/0329683 A1 | 12/2013 | Gachon et al. |
| 2013/0344857 A1 | 12/2013 | Berionne et al. |

(56) References Cited

U.S. PATENT DOCUMENTS

| | | | |
|---|---|---|---|
| 2014/0013406 | A1 | 1/2014 | Tremlet et al. |
| 2014/0018041 | A1 | 1/2014 | Summerer et al. |
| 2014/0045462 | A1 | 2/2014 | Warnez |
| 2014/0057680 | A1 | 2/2014 | Proust et al. |
| 2014/0066019 | A1* | 3/2014 | Waters .............. H04L 63/0853 455/411 |
| 2014/0189880 | A1 | 7/2014 | Funk |
| 2014/0215589 | A1 | 7/2014 | Dietrich et al. |
| 2014/0243022 | A1 | 8/2014 | L'Heriteau et al. |
| 2014/0337234 | A1 | 11/2014 | Brewer et al. |
| 2014/0373117 | A1 | 12/2014 | Le Saint |
| 2015/0017910 | A1 | 1/2015 | Li |
| 2016/0006762 | A1 | 1/2016 | Dumoulin et al. |
| 2016/0182512 | A1 | 6/2016 | Chastain et al. |

FOREIGN PATENT DOCUMENTS

| | | |
|---|---|---|
| EP | 1257922 B1 | 6/2006 |
| EP | 1865437 A2 | 12/2007 |
| EP | 1480476 B1 | 10/2008 |
| EP | 2041913 A1 | 4/2009 |
| EP | 2113856 A1 | 11/2009 |
| EP | 2223252 A1 | 9/2010 |
| KR | 2013027097 | 3/2013 |
| WO | 02063517 | 8/2002 |
| WO | 03046719 A2 | 6/2003 |
| WO | WO03046719 | 6/2003 |
| WO | 2007079636 A1 | 7/2007 |
| WO | WO2007079636 | 7/2007 |
| WO | 2008059353 A1 | 5/2008 |
| WO | 2008149196 A1 | 12/2008 |
| WO | WO2009/046400 | 4/2009 |
| WO | WO2010051715 | 5/2010 |
| WO | WO2011/115407 | 9/2011 |
| WO | 2012110880 A1 | 8/2012 |
| WO | 2012151571 A2 | 11/2012 |
| WO | 2013006116 A2 | 1/2013 |
| WO | 2013/036009 | 3/2013 |
| WO | 2013/050296 | 11/2013 |

OTHER PUBLICATIONS

"The OTA Platform in the World of LTE", 14 pgs., Jan. 2011.
"3rd Generation Partnership Project; Technical Specification Group Core Network and Terminals; Characteristics of the Universal Subscriber Identity Module (USIM) application", Release 11, 2012.
"3rd Generation Partnership Project; Technical Specification Group Core Network and Terminals; Remote APDU Structure for (U)SIM Toolkit applications", Release 10, 2012.
"3rd Generation Partnership Project; Technical Specification Group Core Network and Terminals; Secured packet structure for (Universal) Subscriber Identity Module (U)SIM Toolkit applications", Release 10, 2012.
"3rd Generation Partnership Project; Technical Specification Group Core Network and Terminals; UICC-terminal interface; Physical and logical characteristics", Release 10, 2011.
"3rd Generation Partnership Project; Technical Specification Group Core Network and Terminals; Universal Subscriber Identity Module (USIM) Application Toolkit (USAT)", Release 11, 2012.
"GlobalPlatform Card Confidential Card Content Management Card Specification v2.2—Amendment A", 2011.
"GlobalPlatform Card Contactless Services Card Specification v2.2—Amendment C", 2012.
"GlobalPlatform Card Remote Application Management over HTTP Card Specification v2.2—Amendment B", 2012.
"GlobalPlatform Card Security Upgrade for Card Content Management Card Specification v 2.2—Amendment E", 2011.
"GlobalPlatform Card Specification", Version 2.2.1, 2011.
"GlobalPlatform Card Technology Secure Channel Protocol 03 Card Specification v 2.2—Amendment D", 2009.
"GlobalPlatform Device Secure Element Remote Application Management", May 2011.
"GlobalPlatform Device Technology Secure Element Access Control", Version 1.0, May 2012.
"GlobalPlatform Device Technology TEE System Architecture", Dec 2011.
"GlobalPlatform Key Management System", Functional Requirements, Nov. 2003.
"GlobalPlatform System Messaging Specification for Management of Mobile-NFC Services", Feb. 2011.
"Reprogrammable SIMs: Technology, Evolution and Implications", csmg, Sep. 25, 2012.
"Smart Cards; Card Application Tookit (CAT)", Release 11, 2012.
"Smart Cards; ETSI numbering system for telecommunication application providers", Release 11, 2011.
"Smart Cards; Machine to Machine UICC; Physical and logical characteristics", Release 9, 2011.
"Smart Cards; Remote APDU structure for UICC based applications", Release 11, 2012.
"Smart Cards; Secured packet structure for UICC based applications", Release 11, 2012.
"Smart Cards; Security mechanisms for UICC based Applications—Functional requirements", Release 8, 2008.
"Smart Cards; UICC Application Programming Interface (UICC API) for Java Card™", Release 9, 2012.
"Smart Cards; UICC-Terminal Interface; Physical and logical characteristics", Release 10, 2011, 179 pages.
"Universal Mobile Telecommunications System (UMTS); UICC-terminal interface; Physical and logical characteristics", Release 10, 2011.
Chen, , "An efficient end-to-end security mechanism for IP multimedia subsystem", Computer Communications, 2008, vol. 31.18, pp. 4259-4268.
Dodson, Ben et al., "Snap2Pass: Consumer-Friendly Challenge—Response Authentication with a Phone", http://prpl.stanford.edu/papers/soups10j.pdf, Apr. 30, 2010.
Global Platform, "Secure Element Remote Application Management", Version 1.0, May 2011.
Imhontu, et al., "A survey on near field communication in mobile phones & PDAs", Dissertation Halmstad University, 2010. http://hh.diva-portal.org/smash/get/diva2:385433/FULLTEXT01.
Kim, Jong-Min et al., "A Study of Coupons issuance System Considering of User Convenience Based on NFC", 3rd International Conference on Computer Science and Information Technology (ICCSIT'2013) Jan. 4-5, 2013 Bali (Indonesia). http://psrcentre.org/images/extraimages/113118.pdf.
Kounelis, Ioannis et al., "Secure Middleware for Mobile Phones and UICC Applications", Mobile Wireless Middleware, Operating Systems, and Applications, Springer Berlin Heidelberg, 2012, 143-152.
Kounelis, Ioannis et al., "Security of service requests for cloud based m-commerce", MIPRO, 2012 Proceedings of the 35th International Convention, IEEE, 2012.
Meyerstein, et al., "Security Aspects of Smart Cards vs. Embedded Security in Machine-to-Machine (M2M) Advanced Mobile Network Applications", InterDigital Communications Corporation LLC, First International ICST Conference: MobiSec 2009, Security and Privacy in Mobile Information and Communication Systems, p. 214-225, Jun. 3-5, 2009.
Nagalakshmi, et al., "Modified Protocols for Internet Key Exchange (IKE) Using Public Encryption and Signature Keys", Information Technology: New Generations (ITNG), 2011 Eighth International Conference on, 2011, pp. 376, 381.
Zhang, et al., "Cryptographic Key Agreement Protocol Simulation", Semantics Knowledge and Grid (SKG), 2010 Sixth International Conference on, 2010, pp. 418, 419.
"Secure Authentication for Mobile Internet Services", Sim Alliance, http://simalliance.org/wp-content/uploads/2015/03/12-01-01-WP_SIMallianceSecureAuthentication-EN-V1.1.pdf, Dec. 2011, 1-23.
Farhat, Farshid et al., "Private Identification, Authentication and Key Agreement Protocol with Security Mode Setup", Iran Tele-

(56) References Cited

OTHER PUBLICATIONS communication Research Center, https://eprint.iacr.org/2011/045.pdf, Apr. 2011, 21 pages.

* cited by examiner

200

APPARATUS AND METHOD FOR SECURE OVER THE AIR PROGRAMMING OF A COMMUNICATION DEVICE

CROSS-REFERENCE TO RELATED APPLICATION(S)

This application is a continuation of U.S. patent application Ser. No. 14/069,908, filed Nov. 1, 2013, which is incorporated herein by reference in its entirety.

FIELD OF THE DISCLOSURE

The subject disclosure relates to an apparatus and method for secure over-the-air programming of a communication device.

BACKGROUND

Electronic devices are being utilized with more frequency to conduct various types of transactions and exchanges of information. The electronic devices can be provisioned with programming data, including an initial provisioning and subsequent provisioning(s). The provisioning can sometimes include receiving the programming data from a remote source.

BRIEF DESCRIPTION OF THE DRAWINGS

Reference will now be made to the accompanying drawings, which are not necessarily drawn to scale, and wherein.

DETAILED DESCRIPTION

Figure 1:
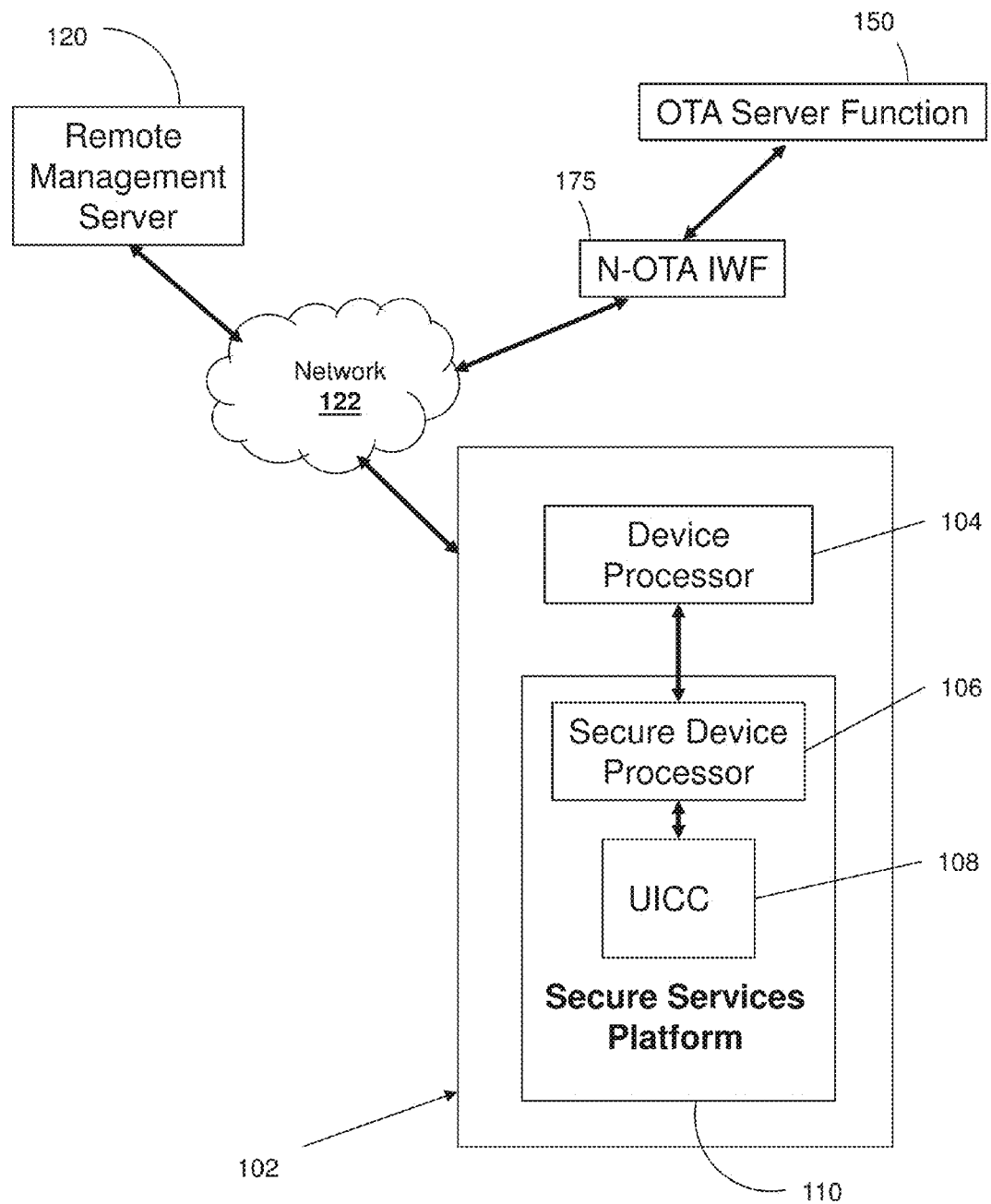
FIG. 1 depicts an illustrative embodiment of a system that enables use of a UICC and a secure device processor as part of a secure services platform for a secure over-the-air programming of a communication device.

The subject disclosure describes, among other things, illustrative embodiments in which Over-The-Air programming (OTA) messages can be securely delivered to a communication device(s). The secure delivery can be performed using a Network OTA Interworking Function (N-OIF) that communicates with the communication device. The communication device can be a mobile device that includes a User OTA Interworking Function (U-OIF) that operates in a Secure Device Processor (SDP) of the mobile device. The U-OIF can be in communication with a secure element (hereinafter referred to as a Universal Integrated Circuit Card (UICC)) of the mobile device, such as via a baseband proxy (e.g., operating in a device processor of the mobile device). In one or more embodiments, the U-OIF, the UICC and the device processor (including the baseband proxy) can be separate but in communication with each other. The UICC can be a highly secure computing platform for storing secrets such as encryption keys and authentication credentials, and can host and execute applets. The SDP can be a processor that is logically and/or physically separate from the device processor and can offer more security than the device processor, but not as much security as the UICC. Examples of an SDP include a Trusted Execution Environment (TEE) and an embedded Secure Element (eSE). In one or more embodiments, the U-OIF in conjunction with the N-OIF can provide a secure means for delivering OTA messages, including various programming data, to the UICC to enable the UICC to utilize the programming data (e.g., executing software updates, adjusting configuration settings or parameters and so forth).

In one or more embodiments, SMS-based OTA messages between a UICC and an OTA server can be converted from SMS to IP (e.g., HyperText Transfer Protocol (HTTP)), transmitted via HTTP, and converted back to SMS (e.g., SMPP). This can be performed through use of various devices including the N-OIF and the U-OIF. In one embodiment, the baseband proxy of the mobile device can facilitate delivery of the OTA messages/responses, such as by acting as an intermediate component, between the U-OIF and the UICC, which is capable of performing additional conversion of the OTA message. In one or more embodiments, additional security mechanisms can be provided for SMS-based OTA messages. In one or more embodiments, network-based traffic management can be provided for SMS-based OTA messages. In one or more embodiments, network and device functionality can be managed remotely. In one or more embodiments, multiple OTA servers can be supported. In one or more embodiments, legacy OTA server processes, such as 03.48 encryption techniques, can be supported.

In one or more embodiments, HTTP-based OTA communications can be utilized between SMS-based, legacy UICCs and OTA servers. In one or more embodiments, interworking functions (N-OIFs and U-OIFs) can be downloaded to appropriate devices to enable converting SMS-based OTA messages to IP for transport via HTTP. In one or more embodiments, a network-based InterWorking Function (IWF) can be provided for traffic management of SMS-based OTA messages. In one or more embodiments, the IWFs can provide an additional layer of security for SMS-based OTA. In one or more embodiments, an SDP can be utilized as, or otherwise provisioned with, an IWF within the device. In one or more embodiments, a baseband proxy can be used to communicate between the U-OIF and the UICC. In one or more embodiments, remote management of the IWFs can be performed.

Other embodiments are included in the subject disclosure.

One embodiment of the subject disclosure is a method including receiving, by a network interworking function operating in a server, an over-the-air programming message that is utilizing a short message service transport protocol, where the over-the-air programming message includes programming data for use by a mobile communication device. The method can include converting, by the network interworking function, the over-the-air programming message to a hypertext transfer protocol to generate a first adjusted message that includes the programming data. The method can include registering, by the network interworking function, an internet protocol address associated with a user interworking function operating in a secure device processor of the mobile communication device, where the registering of the internet protocol address is based on a mutual authentication of the network interworking function and the user interworking function utilizing a first keyset. The method can include providing, by the network interworking function, the first adjusted message to the user interworking function to enable the user interworking function to convert the first adjusted message to the short message service transport protocol to generate a second adjusted message that includes the programming data, where the providing of the first adjusted message to the user interworking function further enables the user interworking function to provide the second adjusted message to a universal integrated circuit card via a baseband proxy operating in a device processor of the mobile communication device, and where the secure device processor, the universal integrated circuit card and the device processor are separate from each other and are in communication with each other.

One embodiment of the subject disclosure includes a computer readable storage device comprising computer instructions which, responsive to being executed by a user interworking function of a secure device processor of a mobile communication device, cause the user interworking function to perform operations including receiving, from a network interworking function operating in a server, an over-the-air programming message that is utilizing a hypertext transfer protocol, where the over-the-air programming message includes programming data for use by the mobile communication device. The user interworking function can convert the over-the-air programming message to a short message service transport protocol to generate an adjusted message that includes the programming data. The user interworking function can provide the adjusted message to a universal integrated circuit card of the mobile communication device via a baseband proxy operating in a device processor of the mobile communication device, where the secure device processor, the universal integrated circuit card and the device processor are separate from each other and are in communication with each other.

One embodiment of the subject disclosure is a method that includes receiving, by a universal integrated circuit card of a mobile communication device, an over-the-air programming message including programming data. The over-the-air programming message can be received from a user interworking function of a secure device processor of the mobile communication device via a baseband proxy operating in a device processor of the mobile communication device. The secure device processor, the universal integrated circuit card and the device processor can be separate from each other and can be in communication with each other. The over-the-air programming message can be received by the user interworking function in a hypertext transfer protocol and can be converted to a short message service transport protocol. The method can include generating, by the universal integrated circuit card, a response based on the over-the-air programming message. The method can include providing, by the universal integrated circuit card, the response to the user interworking function via the baseband proxy to enable the user interworking function to convert the response to the hypertext transfer protocol to generate a first adjusted response, where the providing of the response to the user interworking function further enables the user interworking function to provide the first adjusted response to a network interworking function operating in a server for conversion to a second adjusted response that is in the short message service transport protocol.

In accordance with an embodiment of the disclosure, FIG. 1 depicts a system 100 that includes a communication device 102 connected to or otherwise in communication with a network 122 and provided with a secure services platform 110 enabling authentication of other communication devices, encrypted communication with those devices, and/or secure communications related to OTA messages. Device 102 can be loaded with the U-OIF to enable or otherwise facilitate processing of messages and responses related to OTA.

It will be appreciated that the communication device 102 may be any device, including a user device, which has a UICC and a secure device processor. The term "user," in this example, refers to a human user of the communication device. However, in other embodiments, the user can be a machine that exchanges data with the communication device 102 after being authenticated to the communication device. Communication device 102 can include a device processor 104, a SDP 106 and a UICC 108. The UICC 108 can be various types of smart cards including a Subscriber Identification Module (SIM) card or other type of secure element. The UICC 108 can be a secure computing platform and can offer a high level of security for storing encryption keys, authentication credentials, and the like. The UICC 108 may be removable from the device. In other embodiments, the UICC 108 may be embedded in the device and not removable. In other embodiments, the UICC 108 can be placed on a memory card or an embedded chip.

The SDP 106 can be logically and/or physically separate from the device processor 104, and can be connected to both the device processor and the UICC 108. In this embodiment, the SDP 106 can offer a higher level of security than the device processor 104, and can store and execute secure applications. The SDP 106 can, for example, run applications in a TEE. The UICC 108 and SDP 106 together can form a secure services platform 110 resident on the device 102. In this embodiment, UICC 108, SDP 106 and device processor 104 can each have a security level associated therewith, and the security level associated with the SDP 106 can be intermediate between that of the UICC 108 and that of the device processor 104. The SDP and UICC 108 can use mutual authentication, as described in more detail below.

The UICC 108 and SDP 106 can communicate with a remote management (function) server 120, located remotely from device 102. The Remote Management Server (RMS) 120 can be a platform for provisioning and/or managing applications in the UICC 108 and SDP 106. The RMS 120 can also manage data (such as keys, credentials, and so forth) that are used by the applications. Examples of remote management servers are described in U.S. patent application Ser. No. 13/679,479 filed on Nov. 16, 2012 and U.S. patent application Ser. No. 13/680,680 filed on Nov. 19, 2012, the disclosures of both of which are hereby incorporated by reference. In one or more embodiments, the remote management server 120 can provision other devices, such as providing keys to the N-OIF.

In this embodiment, user device 102 can be a wireless communication device connected to a cellular network 122.

Network 122 can also be other types of networks operating according to various communication protocols, such as a WiFi network. In other embodiments, device 102 can be connected to other devices via a wired connection through a computer. In still other embodiments, user devices can communicate with each other using Bluetooth, infrared communications (IRDa) and/or near field communications (NFC). A communication session between user devices, wherein information is transferred between the users, can be effected by a wide variety of arrangements. A secure application server (SAS) can be used in some embodiments to establish a secure communication session between devices. However, in some embodiments a secure application server may not be used where the communication session is established in a peer-to-peer manner, such as in Bluetooth, IRDa or NFC.

System 100 enables components of the secure services platform 110 (e.g., a U-OIF of the SDP 106) to perform operations including receiving, from an N-OIF 175 operating in a server, an OTA message that is utilizing a HTTP, where the OTA message includes programming data for use by the mobile communication device; converting the OTA message to a SMS transport protocol (e.g., SMPP) to generate an adjusted message that includes the programming data; and providing the adjusted message to the UICC of the mobile communication device via the baseband proxy operating of the mobile communication device. In this example, the baseband proxy can be operating in a device processor of the mobile communication device, where the SDP, the UICC and the device processor are separate from each other and are in communication with each other. In one embodiment, an IP address can be registered with the N-OIF 175, where the IP address is associated with the U-OIF, and where the registering of the IP address is based on a mutual authentication of the N-OIF and the U-OIF utilizing a first keyset (e.g., OTA IWF keyset) that is provided to the U-OIF and the N-OIF by a remote management server. In one embodiment, the first keyset is provided to the U-OIF utilizing a remote management keyset. In one embodiment, authentication of the U-OIF with the baseband proxy can be performed prior to the providing of the adjusted message to the UICC. In one embodiment, the authenticating with the baseband proxy can be based on a second keyset. In one embodiment, a response that is utilizing the SMS transport protocol can be received by the U-OIF from the UICC via the baseband proxy, where the response is received from the universal integrated circuit card via the baseband proxy; the response can be converted to HTTP to generate an adjusted response; and the adjusted response can be provided to the N-OIF. In one embodiment, the response can be encrypted (e.g., by the U-OIF) utilizing the first keyset (e.g., OTA IWF keyset) that is provided to the U-OIF and the N-OIF 175 by a remote management server 120, where the encrypting is performed prior to the generating of the adjusted response. In one embodiment, the OTA message can be decrypted (e.g., by the U-OIF) utilizing a first keyset that is provided to the U-OIF and the N-OIF by a remote management server, where the decrypting is performed prior to the generating of the adjusted message.

System 100 enables components of the secure services platform 110 (e.g., the UICC 108) to perform operations including receiving, by the UICC from a U-OIF of the SDP via a baseband proxy, an OTA message including programming data, where the SDP, the UICC and the device processor (executing the baseband proxy) are separate from each other and are in communication with each other, and where the OTA message is in HTTP and converted to an SMS transport protocol (e.g., SMPP). In this example, a response can be generated at the UICC based on the OTA message. The response can be provided to the U-OIF via the baseband proxy to enable the U-OIF to convert the response, such as from SMS to HTTP, to generate a first adjusted response, where the providing of the response to the U-OIF enables the U-OIF to provide the first adjusted response to a N-OIF operating in a server for conversion to a second adjusted response that is in SMS transport protocol. In one embodiment, the UICC can decrypt the OTA message utilizing a keyset, where the keyset is stored by the UICC and an OTA server 150 that originated the OTA programming message. In another embodiment, the keyset is not stored by, or otherwise accessible to, the U-OIF and/or the N-OIF. System 100 illustrates a single N-OIF and a single OTA server, however, the exemplary embodiments can utilize any number of N-OIFs and OTA servers. Additionally, the N-OIF can be executed on a server that is different from the OTA server or the N-OIF and the OTA server function can be implemented at the same server.

Figure 2:
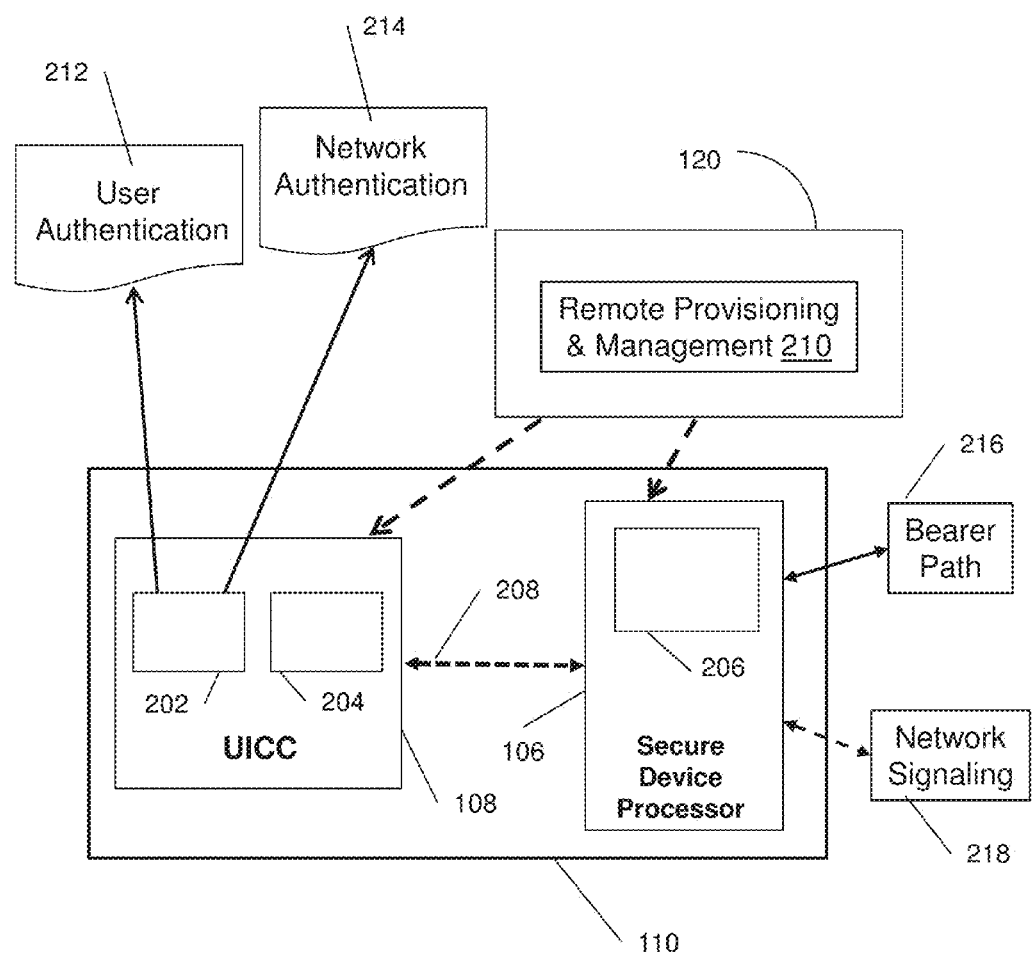
FIG. 2 depicts an illustrative embodiment of a system including the communication device of FIG. 1 implementing authentication and management functions, as well as provisioning functions.

FIG. 2 is a schematic illustration 200 showing details of a secure services platform 110, according to an embodiment of the disclosure, which can be used with the communication device 102 of FIG. 1. The UICC 108 can contain an authentication management function 202 and a real-time encryption key generator 204. The authentication management function 202 can provide authentication services for the device. For example, the authentication management function 202 can support mutual authentication of devices, support a mutual authentication of the device, such as with the RMS 120 of FIG. 1. As shown in FIG. 2, the authentication management function 202 can include a user authentication service 212 for authenticating the user to the device and a network authentication service 214 for authenticating the device to network equipment. The real-time encryption key generator 204 can supply encryption keys to a real-time encryption engine 206 which is located in the SDP 106. The real-time encryption engine 206 can encrypt and decrypt user information transmitted to or from a bearer path 216 that terminates at another device (e.g., another user device), and may encrypt and decrypt information transmitted on a signaling path 218 to the network. In another embodiment, the encryption engine can be loaded on a second UICC, separate from the UICC 108.

The RMS 120 can perform a remote provisioning and management function 210 to load applications, content and/or other information (e.g., various keysets) into the UICC 108 and/or SDP 106. In this embodiment, the RMS 120 can provision the authentication management function 202 and real-time encryption key generator 204 on the UICC 108, and can provision the real-time encryption engine 206 on the SDP 106. This can be done securely by the use of one or more remote management keysets. In one embodiment, before the secure services platform 110 can be used for communication, the SDP 106 can be authenticated by the UICC 108. In one embodiment, this can be done using a UICC-SDP keyset. The UICC-SDP keyset may be provisioned remotely by the RMS 120 or locally by an authorized user. In this embodiment, after the UICC 108 and SDP 106 are mutually authenticated using the UICC-SDP keyset, they can communicate via a signaling path 208 within the secure services platform 110. The UICC-SDP keyset may be used for secure communication during initial loading and provisioning. However, the keys being utilized may be different. In one embodiment, the path between the UICC 108 and the SDP 106 can go through the device processor 104 rather than directly between the UICC and the SDP.

In this embodiment of FIG. 2, the secure services platform 110 enables processing messages and responses related to OTA. These messages and responses can be converted between SMS transport protocol (e.g., SMPP) and IP protocol (e.g., HTTP) so that the end points of the communication (e.g., the UICC and the OTA server) receive the programming data and/or the response related to the programming data. Various keysets can be distributed between pairs of devices or components, such as providing an SDP keyset to both of the U-OIF and the baseband proxy, providing an OTA IWF keyset to both of the N-OIF and the U-OIF, and/or providing an OTA server keyset to both the OTA server and the UICC. In one embodiment, the provisioning of one or more of these keysets can be performed by the remote management server, such as through use of remote management keysets.

Figures 3A, 3B:
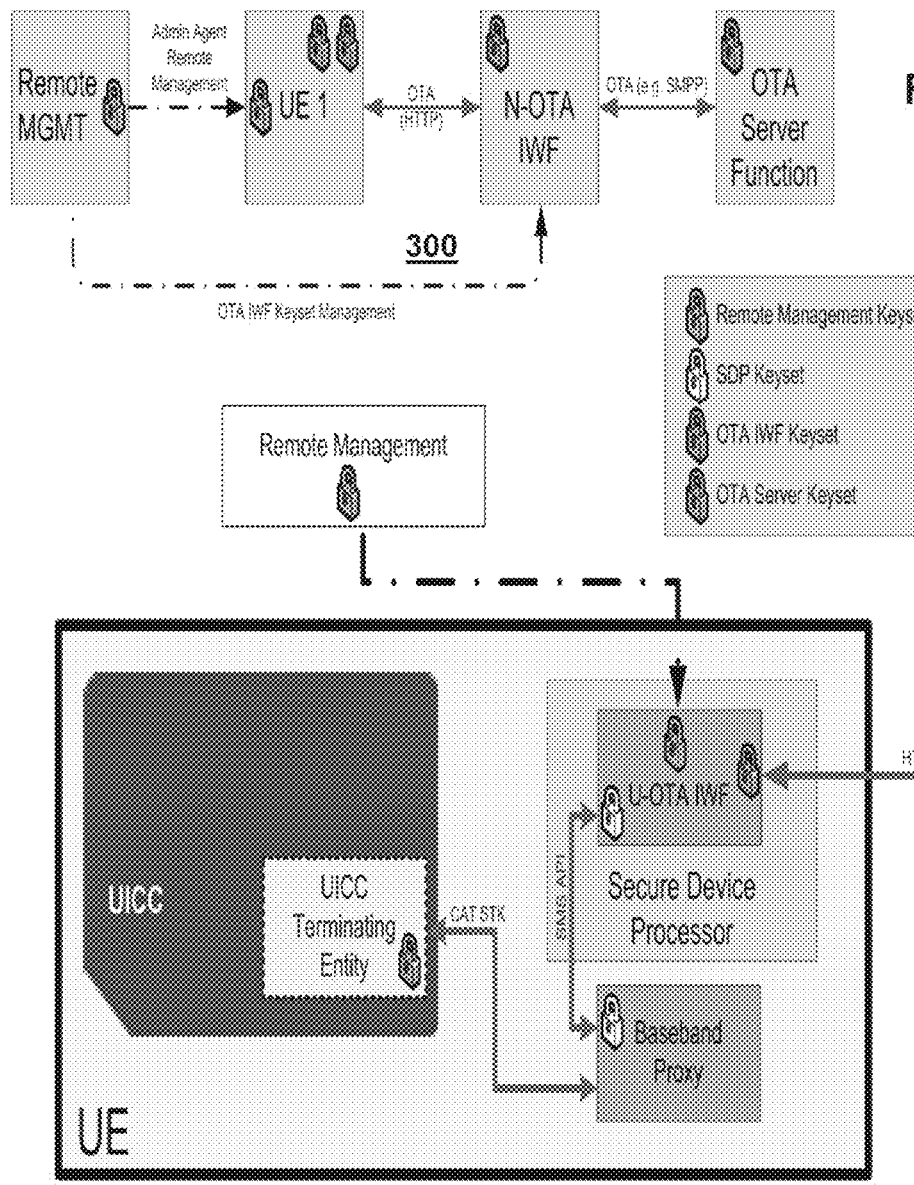
FIGS. 3A-3B depict an illustrative embodiment of a system that can be used for securely providing over-the-air programming of a communication device.

Referring to FIGS. 3A-B, a system 300 is depicted which illustrates a secure process for providing messages and responses related to OTA. System 300 can include providing IP-based OTA between legacy UICCs and OTA servers which may not support it. A method of delivering SMS-based OTA messages to a UICC via an IP network is provided. SMS-based messages can be sent from an OTA server via a suitable SMS-based transport protocol, such as SMPP, to an N-OIF which converts the message to HTTP. The N-OIF can queue the message and schedule it for transmission to a U-OIF which may reside in an SDP. The U-OIF can convert the message back to SMS transport protocol (e.g., SMPP) and can transmit to the UICC, such as via a baseband proxy. The U-OIF can provide a response (related to, or otherwise generated because of, the receiving of the OTA message) back to the N-OIF via HTTP where the N-OIF can correlate this response with the initial transmission. The N-OIF can provide reliable transport to the U-OIF and can retransmit the message if necessary. In one embodiment, the N-OIF can provide additional encryption for the OTA message and can decrypt a response to the OTA message.

In one embodiment, the N-OIF can transmit and receive messages to/from an OTA server for SMS-based OTA messages. This can include converting protocols for transmission to and from the OTA server (e.g., HTTP to/from SMS such as SMPP). In one embodiment, the N-OIF can transmit and receive messages to/from a U-OIF for SMS-based OTA messages. The N-OIF can manage the communication path to the UICC including: providing a message queue; supporting prioritization of messages; providing a scheduler function (e.g., schedules packets for transmission); supporting transmission through retransmission and a retransmission timer; and/or providing response correlation, such as tracking and correlating responses for each transmission. In one embodiment, the N-OIF can support transport security between itself and a U-OIF including encryption and authentication via an OTA IWF keyset. In another embodiment, the N-OIF may connect to multiple OTA servers.

In one embodiment, the SDP can contain or otherwise execute the U-OIF. The U-OIF can transmit and receive messages to/from a N-OIF, and can support transport security between itself and the N-OIF including encryption and authentication via an OTA IWF keyset. In one or more embodiments, the U-OIF can transmit and receive messages to/from the UICC via a baseband proxy, and can convert protocols for transmission to and from the UICC (e.g., HTTP to/from SMS such as SMPP). In one embodiment, the U-OIF can register an IP address with the N-OIF, and can authenticate with the baseband proxy using an SDP keyset.

In one embodiment, the baseband proxy can communicate with the U-OIF via an SMS API, can communicate with the UICC via CAT STK, and/or can authenticate the U-OIF. In one embodiment, a remote management server can manage the applications on the SDP and can manage the OTA IWF keys which are loaded into the N-OIF and the U-OIF. For example, these loading operations can be done securely by the use of one or more Remote Management Keysets. These keysets can be used to mutually authenticate the UICC and SDP with the remote management server and to enable encryption between them.

Figures 4A, 4B:
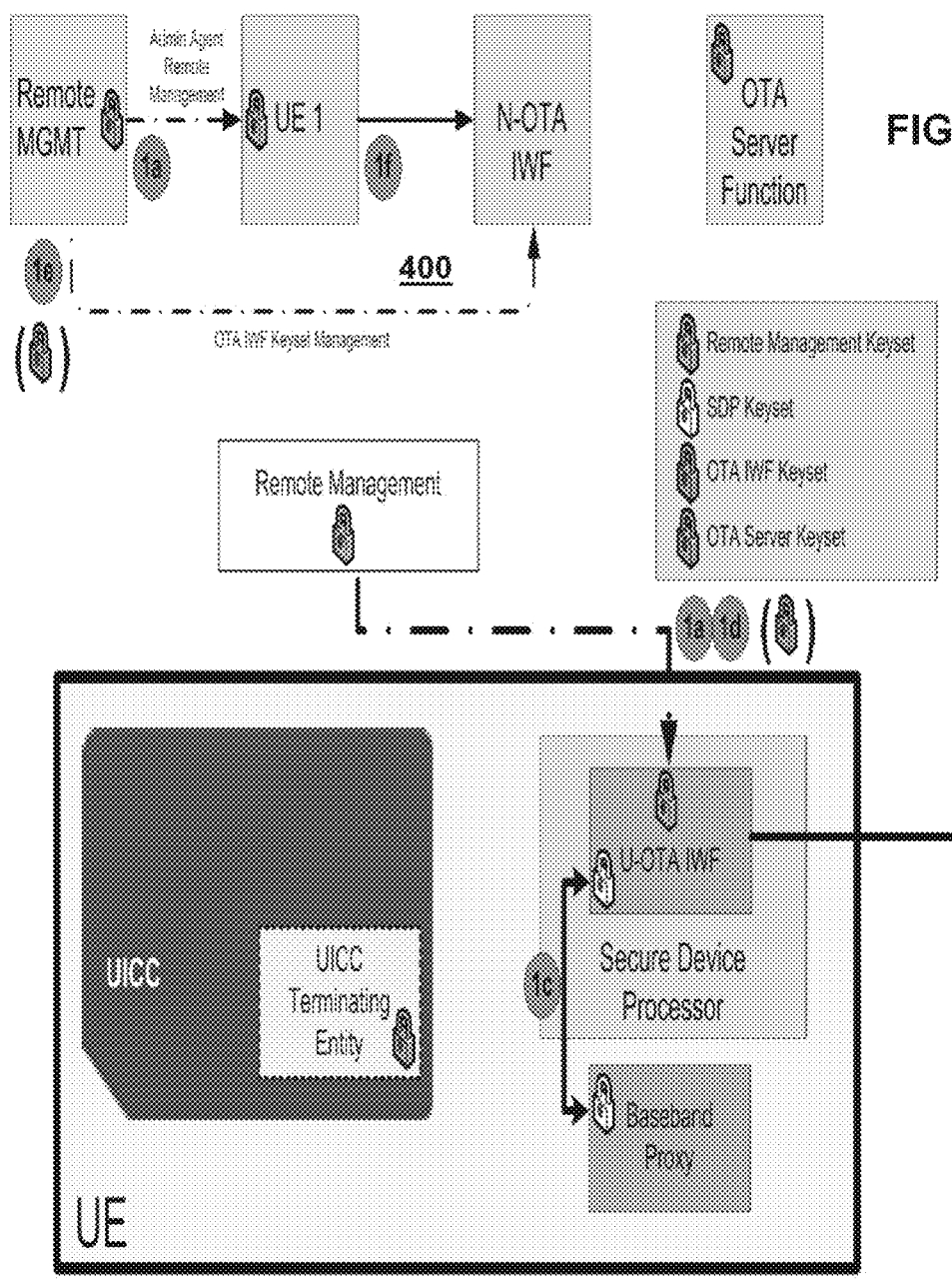
FIGS. 4A-4B depict an illustrative embodiment of a system that can be used for provisioning devices that are engaged in securely providing over-the-air programming of a communication device.

Referring to FIGS. 4A-B, system 400 is depicted which illustrates loading or otherwise provisioning the end user device(s) with the applications that are utilized by the secure services platform for performing the secure OTA messaging process. In one embodiment, the U-OIF can be loaded remotely. For instance, if the application has not been loaded at the time of manufacture, then at 1a, the remote management server downloads the U-OIF to the SDP of the UE. For instance, remote management keysets can be used to securely transmit information from the remote management server to the UE(s). This process can include mutual authentication and/or encryption. At 1c, the U-OIF can authenticate with the baseband proxy using a different SDP Keyset. At 1d, the remote management server can download one or more OTA IWF keys to the U-OIF. For instance, this can be performed using a remote management keyset. At 1e, the remote management server can provide the OTA IWF key to the N-OIF. At 1f, the U-OIF can register its IP address with the N-OIF. This process can include mutual authentication and/or encryption using the IWF OTA keys.

Figure 5A:
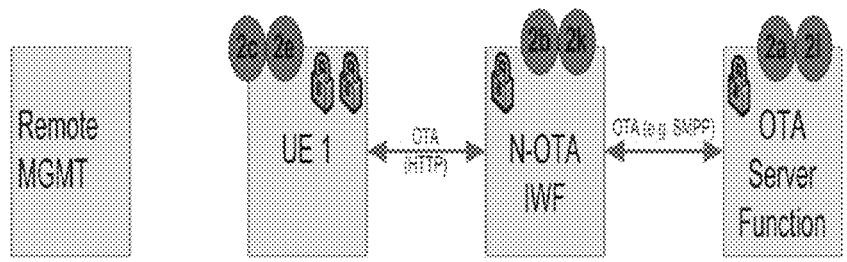
FIGS. 5A-5B depict an illustrative embodiment of a system that can be used for providing secure over-the-air programming of a communication device.
Figure 5B:
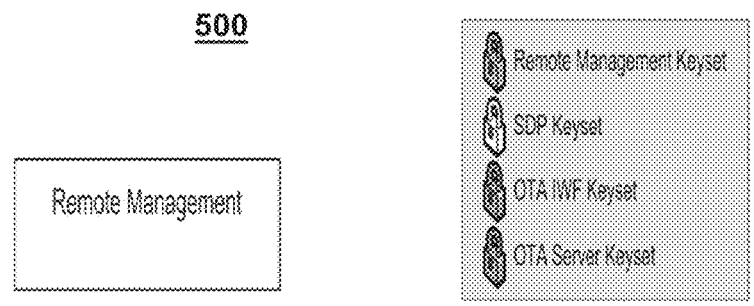
Figure 5B:
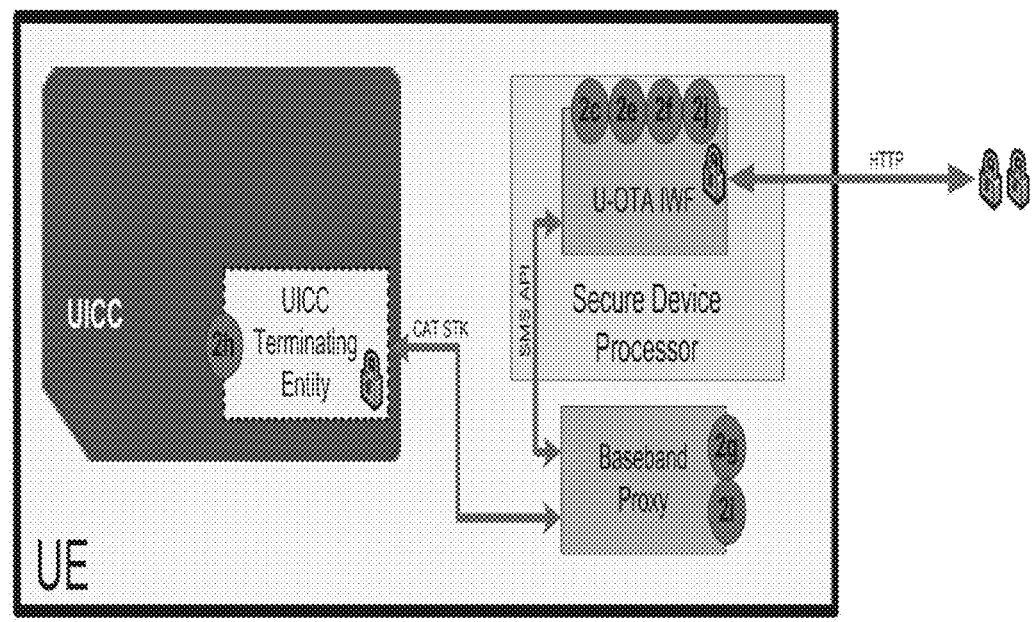

Referring to FIGS. 5A-B, system 500 is depicted which illustrates a process for securely communicating messages and responses related to OTA. The process can commence with the OTA server forwarding an OTA message to the N-OIF for transmission to the UICC of the mobile device. This can be part of a group provisioning effort, such as a software update that is to be distributed to a group of mobile devices. At 2a, the OTA server can prepare a message for delivery to the UICC and sends it to the N-OIF. The OTA server may encrypt the message using an OTA server keyset (e.g., 03.48). At 2b, the N-OIF can prepare the message for transmission to the U-OIF. This may involve the following: verifying that the UICC is registered and reachable via HTTP; converting the message protocol to HTTP; and/or encryption using an OTA IWF Keyset (e.g., SCP81). As described elsewhere, the message can include various programming data, including one or more electronic files. At 2c, the U-OIF can receive the message and can check to see if it is encrypted with an OTA IWF Keyset. If it is not encrypted with this key, the U-OIF can act upon the message as described in Step 2f. At 2e, the U-OIF can decrypt the message using its OTA IWF key. At 2f, the U-OIF can convert the message from HTTP to SMS (e.g., SMPP) and can schedule it for transmission to a UICC terminating entity via the baseband proxy. In one embodiment, once the message is ready for transmission, the U-OIF can schedule it for transmission, transmit it at the scheduled time, track the response from the UICC, and retransmit if necessary. At 2g, the message can be transmitted to the UICC terminating entity via the baseband proxy. At 2h, the UICC terminating entity can receive the message and can perform actions based on the content of the message (e.g., adjusting configuration parameters, executing software updates, storing settings, and so forth). If the message is encrypted with an OTA server key, the UICC terminating entity can decrypt it using the OTA server key (stored by, or otherwise accessible to, the UICC). The UICC terminating entity may respond to the message. At 2i, if a response is provided, it can be provided through the baseband proxy to the U-OIF. At 2j, the U-OIF can convert the message to HTTP and may encrypt it using an OTA IWF key prior to transmission back to the N-OIF. At 2k, the N-OIF may perform the following actions (e.g., before forwarding the response to the OTA server): decrypt the message with an OTA IWF key; correlate, or otherwise map, the response with the initial message; and/or convert the message to SMS (e.g., SMPP). At 2j, the OTA server can receive the response to the OTA message that it originated.

Figure 6:
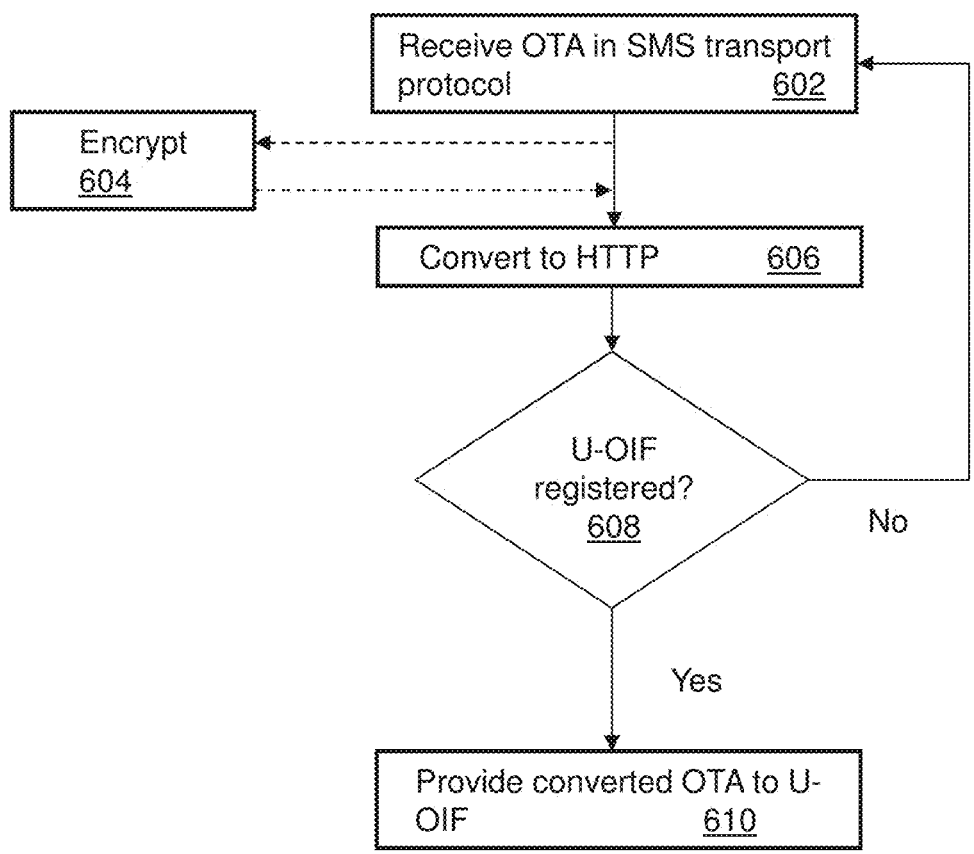
FIG. 6 depicts an illustrative embodiment of a method used in portions of the systems described in FIGS. 1-5B.

FIG. 6 depicts an illustrative embodiment of a method for providing secure over-the-air programming of a communication device. All or a portion of the steps of method 600 can be performed by various devices, including end user devices such as device 102 including secure services platform 110. Method 600 can begin at 602 where an N-OIF, operating in a server, receives an OTA message that is utilizing a SMS transport protocol (e.g., SMPP). The OTA message can include programming data for use by a mobile communication device. The programming data can be various types including software updates, configuration settings, and/or other information that is utilized by the mobile communication device. The programming data can be over-the-air service provisioning (OTASP), over-the-air provisioning (OTAP) and/or over-the-air parameter administration (OTAPA). As an example, the OTA message can be received from an OTA server utilizing SMPP. However, other sources can originate the OTA message and other types of SMS transport protocols can be utilized.

In one embodiment at 604, the N-OIF can encrypt the OTA message. The encryption can be based on an OTA IWF keyset. For example, the OTA IWF keyset can be provided to the N-OIF and a U-OIF (operating in an SDP of the mobile communication device) by an RMS. In one embodiment, the providing of the OTA IWF keyset to the N-OIF and the U-OIF by the RMS is performed utilizing remote management keysets.

At 606, the N-OIF can convert the OTA message to HTTP to generate a first adjusted message that includes the programming data. At 608, the N-OIF can verify a registration associated with the mobile communication device. This verification can be in conjunction with registering an IP address associated with the U-OIF and/or the UICC. In one embodiment, the registering of the IP address can be based on a mutual authentication of the N-OIF and the U-OIF utilizing OTA IWF keyset. In one embodiment, the N-OIF can determine whether the UICC can receive the OTA message via a transmission using HTTP.

If the U-OIF is not registered then method 600 can return to 602 and can monitor for incoming OTA messages (such as from one or more OTA servers). If the U-OIF is registered with the N-OIF then method 600 can proceed to 610 and provide the first adjusted message (e.g., the OTA message in HTTP) to the U-OIF of the mobile communication device. In one or more embodiments, the providing of the first adjusted message to the U-OIF enables the U-OIF to convert the first adjusted message back to an SMS transport protocol (e.g., SMPP) to generate a second adjusted message that includes the programming data. In this example, the U-OIF can then provide the second adjusted message to the UICC via a baseband proxy (e.g., operating in a device processor of the mobile communication device). In one or more embodiments, the SDP, the UICC and the device processor are separate from each other and are in communication with each other. In one embodiment, if the U-OIF is not registered the N-OIF may store the encrypted message for transmission at a later time, such as when the U-OIF becomes registered. It may then go back to state 602. In one embodiment, periodic monitoring for registration can be performed.

In one embodiment, the N-OIF can receive a group of OTA messages (e.g., from the OTA server or from a group of OTA servers), and can determine a priority among the OTA message and the group of OTA messages, where the providing of the first adjusted message to the U-OIF is according to the priority. In one embodiment, the N-OIF can monitor for a response to the first adjusted message originating from the mobile communication device. In one embodiment, the N-OIF can receive a group of OTA messages from a group of OTA servers, and can determine a priority among the group of OTA messages, where the priority is utilized for determining a transmission schedule for the group of OTA messages.

In one embodiment, the N-OIF can receive a response that is utilizing HTTP where the response is received from the U-OIF and is associated with the second adjusted message received by the UICC. In this example, the N-OIF can convert the response to the SMS transport protocol to generate an adjusted response. The N-OIF can correlate the response to the OTA message to identify an OTA server that originated the OTA message. The N-OIF can then provide the adjusted response to the OTA server.

In one embodiment, the N-OIF can decrypt the response utilizing the OTA IWF keyset, wherein the decrypting is performed prior to the generating of the adjusted response, and wherein the OTA IWF keyset is provided to the N-OIF and the U-OIF by an RMS.

In one embodiment, the response can be encrypted (e.g., by the UICC) utilizing an OTA server keyset that is stored by the UICC and the OTA server. In another embodiment, the OTA message can be encrypted (e.g., by the OTA server) utilizing the OTA server keyset that is stored by the UICC and the OTA server. In yet another embodiment, the OTA server keyset is not stored by (or otherwise accessible to) the U-OIF and the N-OIF.

Figure 7:
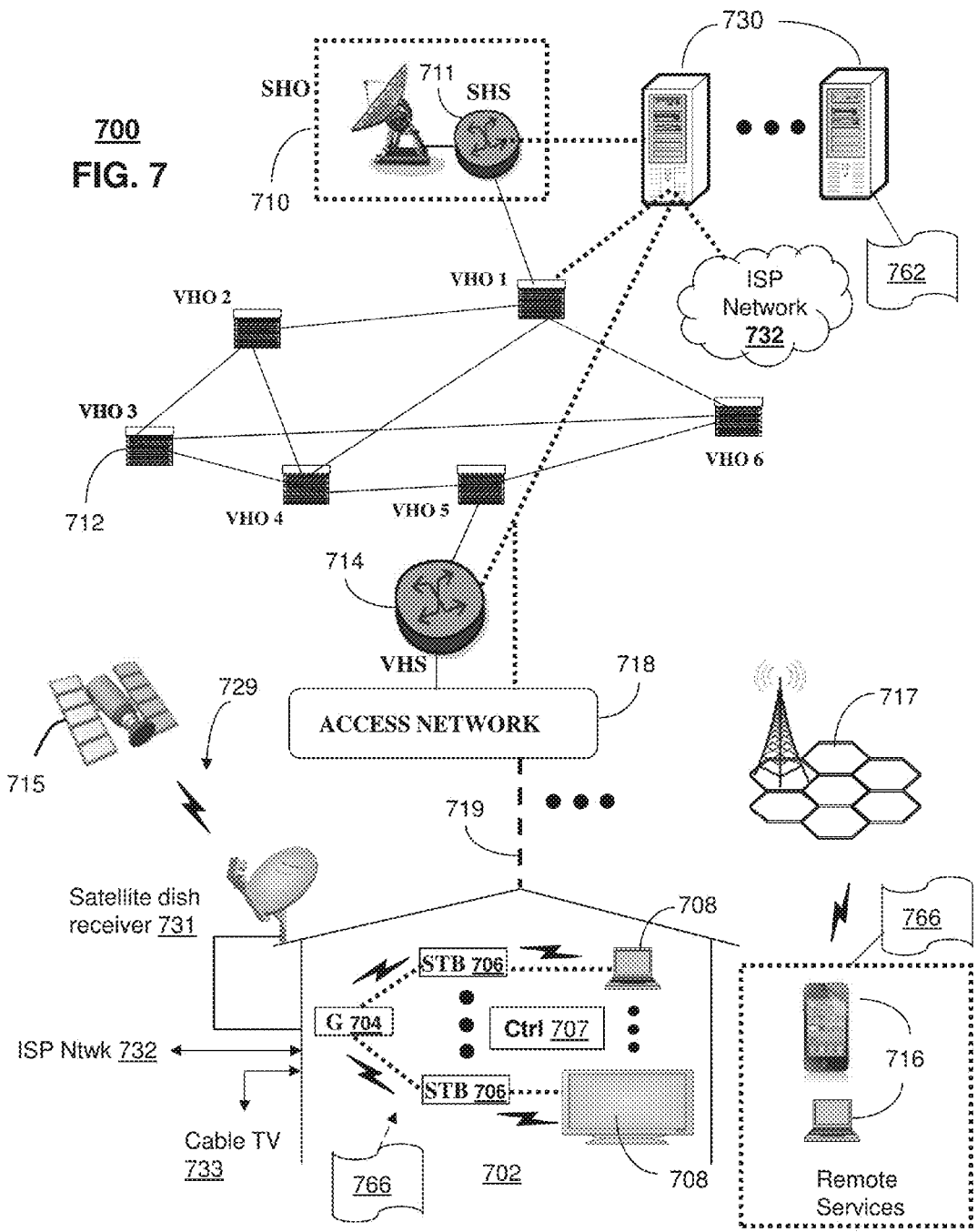
FIG. 7 depicts an illustrative embodiment of a communication system that provides media services including secure communication of over-the-air programming for a communication device.

FIG. 7 depicts an illustrative embodiment of a communication system 700 for delivering media content. The communication system 700 can represent an Internet Protocol Television (IPTV) media system. Communication system 700 can be overlaid or operably coupled with systems 100, 200 of FIGS. 1 and 2 as another representative embodiment of communication system 700. In one or more embodiments, system 700 enables utilizing both the UICC and SDP together to provide a secure platform for delivering messages and responses related to OTA. System 700 can enable conversion of messages and responses related to OTA between SMS transport protocol and HTTP so that the OTA server and the UICC can communicate. Authentication and/or encryption can be performed between various devices (or components of a single device) based on keysets distributed between pairs of devices or components, such as providing an SDP keyset to both of the U-OIF and the baseband proxy, providing an OTA IWF keyset to both of the N-OIF and the U-OIF, and/or providing an OTA server keyset to both the OTA server and the UICC.

The IPTV media system can include a super head-end office (SHO) 710 with at least one super headend office server (SHS) 711 which receives media content from satellite and/or terrestrial communication systems. In the present context, media content can represent, for example, audio content, moving image content such as 2D or 3D videos, video games, virtual reality content, still image content, and combinations thereof. The SHS server 711 can forward packets associated with the media content to one or more video head-end servers (VHS) 714 via a network of video head-end offices (VHO) 712 according to a multicast communication protocol.

The VHS 714 can distribute multimedia broadcast content via an access network 718 to commercial and/or residential buildings 702 housing a gateway 704 (such as a residential or commercial gateway). The access network 718 can represent a group of digital subscriber line access multiplexers (DSLAMs) located in a central office or a service area interface that provide broadband services over fiber optical links or copper twisted pairs 719 to buildings 702. The gateway 704 can use communication technology to distribute broadcast signals to media processors 706 such as Set-Top Boxes (STBs) which in turn present broadcast channels to media devices 708 such as computers or television sets managed in some instances by a media controller 707 (such as an infrared or RF remote controller).

The gateway 704, the media processors 706, and media devices 708 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 706 and subsystems of the IPTV media system for services such as video-on-demand (VoD), browsing an electronic programming guide (EPG), or other infrastructure services.

A satellite broadcast television system 729 can be used in the media system of FIG. 7. The satellite broadcast television system can be overlaid, operably coupled with, or replace the IPTV system as another representative embodiment of communication system 700. In this embodiment, signals transmitted by a satellite 715 that include media content can be received by a satellite dish receiver 731 coupled to the building 702. Modulated signals received by the satellite dish receiver 731 can be transferred to the media processors 706 for demodulating, decoding, encoding, and/or distributing broadcast channels to the media devices 708. The media processors 706 can be equipped with a broadband port to an Internet Service Provider (ISP) network 732 to enable interactive services such as VoD and EPG as described above.

In yet another embodiment, an analog or digital cable broadcast distribution system such as cable TV system 733 can be overlaid, operably coupled with, or replace the IPTV system and/or the satellite TV system as another representative embodiment of communication system 700. In this embodiment, the cable TV system 733 can also provide Internet, telephony, and interactive media services.

The subject disclosure can apply to other present or next generation over-the-air and/or landline media content services system.

Some of the network elements of the IPTV media system can be coupled to one or more computing devices 730, a portion of which can operate as a web server for providing web portal services over the ISP network 732 to wireline media devices 708 or wireless communication devices 716.

Communication system 700 can also provide for computing devices 730 to function as a remote management server, a network interworking function and/or an OTA server (herein referred to as server 730). The server 730 can use computing and communication technology to perform function 762, which can include among other things, receiving an OTA message that is utilizing an SMS transport protocol where the OTA message includes programming data for use by a mobile communication device; converting the OTA programming message to HTTP to generate a first adjusted message that includes the programming data; registering an IP address associated with the U-OIF of the mobile communication device where the registering is based on a mutual authentication of the N-OIF and the U-OIF utilizing a first keyset; and providing the first adjusted message to the U-OIF to enable the U-OIF to convert the first adjusted message to the SMS transport protocol to generate a second adjusted message that includes the programming data, wherein the providing of the first adjusted message to the U-OIF further enables the U-OIF to provide the second adjusted message to a UICC via a baseband proxy operating in a device processor of the mobile communication device.

Function 766 can include functions being performed at the UICC 108 including receiving, from a U-OIF of the SDP via a baseband proxy, an OTA message including programming data, where the SDP, the UICC and the device processor (executing the baseband proxy) are separate from each other and are in communication with each other, and where the OTA message is in HTTP and converted to an SMS transport protocol. In function 766, a response can be generated at the UICC based on the OTA message, and the response can be provided to the U-OIF via the baseband proxy to enable the U-OIF to convert the response to HTTP to generate a first adjusted response, where the providing of the response to the U-OIF enables the U-OIF to provide the first adjusted response to a N-OIF operating in a server for conversion to a second adjusted response that is in SMS transport protocol.

Function 766 can also include functions being performed at the SDP 106 such as receiving, from an N-OIF operating in a server, an OTA message that is utilizing a HTTP, where the OTA message includes programming data for use by the mobile communication device; converting the OTA message to a SMS transport protocol (e.g., SMPP) to generate an adjusted message that includes the programming data; and providing the adjusted message to the UICC of the mobile communication device via the baseband proxy operating of the mobile communication device.

Multiple forms of media services can be offered to media devices over landline technologies such as those described above. Additionally, media services can be offered to media devices by way of a wireless access base station 717 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 8:
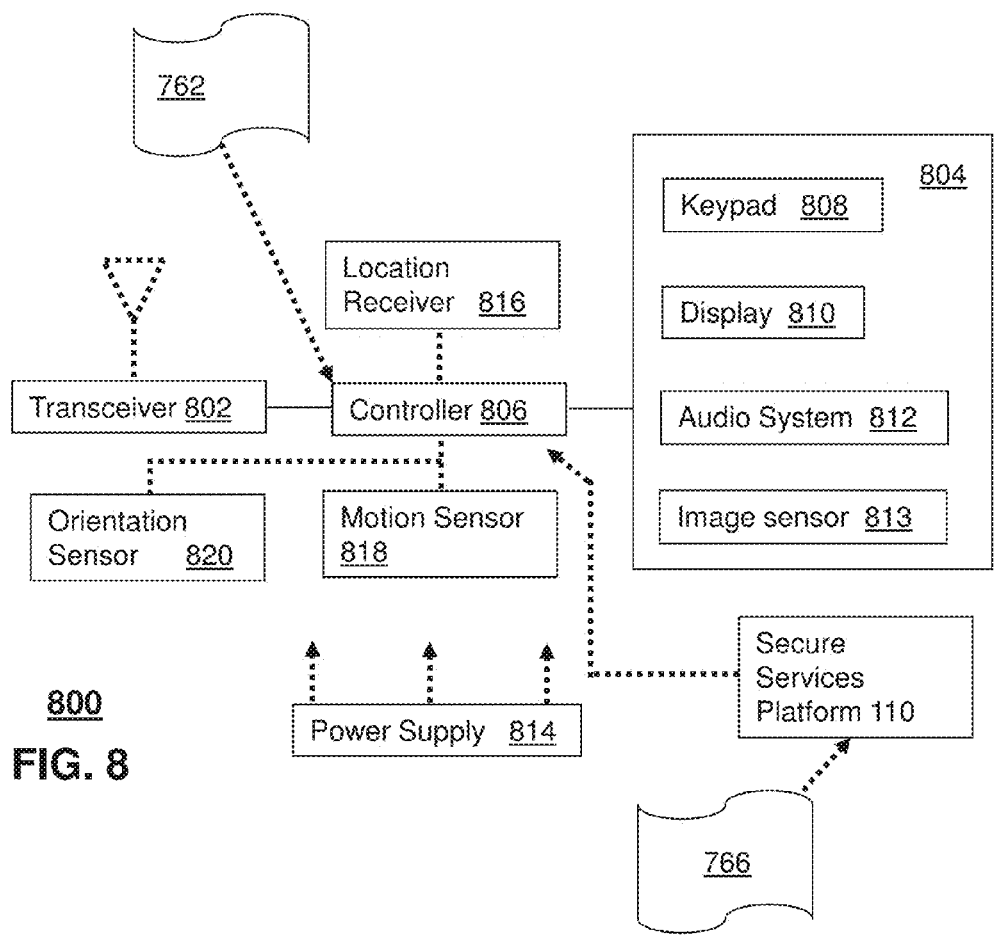
FIG. 8 depicts an illustrative embodiment of a communication device that can securely communicate messages and responses related to over-the-air programming.

FIG. 8 depicts an illustrative embodiment of a communication device 800. Communication device 800 can serve in whole or in part as an illustrative embodiment of the devices depicted in FIGS. 1-5 and 7. For instance, device 800 can include a UICC and a secure device processor in the secure services platform 110 which perform the functions described in the exemplary embodiments herein.

In one or more embodiments, the UICC of device 800 can perform operations including receiving, from a baseband proxy of the device 800, an OTA message including programming data. In this example, the UICC and the device processor (executing the baseband proxy) can be separate from each other and can be in communication with each other, and the OTA message can be in HTTP and converted to an SMS transport protocol. Further in this example, a response can be generated at the UICC based on the OTA message. The response can be provided by the UICC to the U-OIF via the baseband proxy to enable the U-OIF to convert the response to HTTP to generate a first adjusted response, where the providing of the response to the U-OIF enables the U-OIF to provide the first adjusted response to an N-OIF operating in a server for conversion to a second adjusted response that is in SMS transport protocol. In one embodiment, the UICC can decrypt the OTA message utilizing a keyset, where the keyset is stored by the UICC and an OTA server that originated the OTA message. In another embodiment, the keyset is not stored by, or otherwise accessible to, the U-OIF and/or the N-OIF. In one embodiment, communication between the UICC and the baseband proxy is via a CAT STK.

In one or more embodiments, the U-OIF of device 800 can perform operations including receiving, from an N-OIF operating in a server, an OTA message that is utilizing a HTTP, where the OTA message includes programming data for use by the mobile communication device; converting the OTA message to a SMS transport protocol (e.g., SMPP) to generate an adjusted message that includes the programming data; and providing the adjusted message to the UICC of the mobile communication device via the baseband proxy operating of the mobile communication device. In this example, the baseband proxy can be operating in a device processor of the mobile communication device, where the SDP, the UICC and the device processor are separate from each other and are in communication with each other. In one embodiment, an IP address can be registered by the U-OIF with the N-OIF, where the IP address is associated with the U-OIF, and where the registering of the IP address is based on a mutual authentication of the N-OIF and the U-OIF utilizing a first keyset that is provided to the U-OIF and the N-OIF by a remote management server.

To enable these features, communication device 800 can comprise a wireline and/or wireless transceiver 802 (herein transceiver 802), a user interface (UI) 804, a power supply 814, a location receiver 816, a motion sensor 818, an orientation sensor 820, and a controller 806 for managing operations thereof. The transceiver 802 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, NFC, as well as other next generation wireless communication technologies as they arise. The transceiver 802 can also be adapted to support circuit-switched wireline access technologies (such as PSTN), packet-switched wireline access technologies (such as TCP/IP, VoIP, etc.), and combinations thereof.

The UI 804 can include a depressible or touch-sensitive keypad 808 with a navigation mechanism such as a roller ball, a joystick, a mouse, or a navigation disk for manipulating operations of the communication device 800. The keypad 808 can be an integral part of a housing assembly of the communication device 800 or an independent device operably coupled thereto by a tethered wireline interface (such as a USB cable) or a wireless interface supporting for example Bluetooth. The keypad 808 can represent a numeric keypad commonly used by phones, and/or a QWERTY keypad with alphanumeric keys. The UI 804 can further include a display 810 such as monochrome or color LCD (Liquid Crystal Display), OLED (Organic Light Emitting Diode) or other suitable display technology for conveying images to an end user of the communication device 800. In an embodiment where the display 810 is touch-sensitive, a portion or all of the keypad 808 can be presented by way of the display 810 with navigation features.

The display 810 can use touch screen technology to also serve as a user interface for detecting user input. As a touch screen display, the communication device 800 can be adapted to present a user interface with graphical user interface (GUI) elements that can be selected by a user with a touch of a finger. The touch screen display 810 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 810 can be an integral part of the housing assembly of the communication device 800 or an independent device communicatively coupled thereto by a tethered wireline interface (such as a cable) or a wireless interface.

The UI 804 can also include an audio system 812 that utilizes audio technology for conveying low volume audio (such as audio heard in proximity of a human ear) and high volume audio (such as speakerphone for hands free operation). The audio system 812 can further include a microphone for receiving audible signals of an end user. The audio system 812 can also be used for voice recognition applications. The UI 804 can further include an image sensor 813 such as a charged coupled device (CCD) camera for capturing still or moving images.

The power supply 814 can utilize common power management technologies such as replaceable and rechargeable batteries, supply regulation technologies, and/or charging system technologies for supplying energy to the components of the communication device 800 to facilitate long-range or short-range portable applications. Alternatively, or in combination, the charging system can utilize external power sources such as DC power supplied over a physical interface such as a USB port or other suitable tethering technologies.

The location receiver 816 can utilize location technology such as a global positioning system (GPS) receiver capable of assisted GPS for identifying a location of the communication device 800 based on signals generated by a constellation of GPS satellites, which can be used for facilitating location services such as navigation. The motion sensor 818 can utilize motion sensing technology such as an accelerometer, a gyroscope, or other suitable motion sensing technology to detect motion of the communication device 800 in three-dimensional space. The orientation sensor 820 can utilize orientation sensing technology such as a magnetometer to detect the orientation of the communication device 800 (north, south, west, and east, as well as combined orientations in degrees, minutes, or other suitable orientation metrics).

The communication device 800 can use the transceiver 802 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 806 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 800.

Other components not shown in FIG. 8 can be used in one or more embodiments of the subject disclosure. For instance, the communication device 800 can include a reset button (not shown). The reset button can be used to reset the controller 806 of the communication device 800. In yet another embodiment, the communication device 800 can also include a factory default setting button positioned, for example, below a small hole in a housing assembly of the communication device 800 to force the communication device 800 to re-establish factory settings. In this embodiment, a user can use a protruding object such as a pen or paper clip tip to reach into the hole and depress the default setting button. In one embodiment, the communication device 800 can also include a slot for adding or removing the UICC.

The communication device 800 as described herein can operate with more or less of the circuit components shown in FIG. 8. These variant embodiments can be used in one or more embodiments of the subject disclosure.

The communication device 800 can be adapted to perform the functions of the media processor 706, the media devices 708, the portable communication devices 716 and/or the server 730 of FIG. 7. It will be appreciated that the communication device 800 can also represent other devices that can operate in communication system 700 of FIG. 7, such as a gaming console and a media player.

The communication device 800 shown in FIG. 8 or portions thereof can serve as a representation of one or more of the devices of FIGS. 1-5 and 7 including end user devices, customer premises equipment, remote management servers, interworking functions, and/or OTA servers. In one or more embodiments, the OTA server 150 can be operated by or affiliated with a third party entity that is different from and/or independent of the service provider operating the RMS 120. In addition, the controller 806 can perform the functions 762 and/or 766.

Upon reviewing the aforementioned embodiments, it would be evident to an artisan with ordinary skill in the art that said embodiments can be modified, reduced, or enhanced without departing from the scope of the claims described below. For example, in the event that a UICC is determined to be inaccessible via an HTTP message from the N-OIF, an alert can be generated. For instance, the alert can be transmitted to the mobile device to indicate that OTA programming data is available. In another embodiment, the alert can cause the N-OIF or another network element to determine if there are other alternate delivery techniques available for the UICC.

In one or more embodiments, the device processor executing the baseband proxy can be a baseband processor of the communication device.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 9:
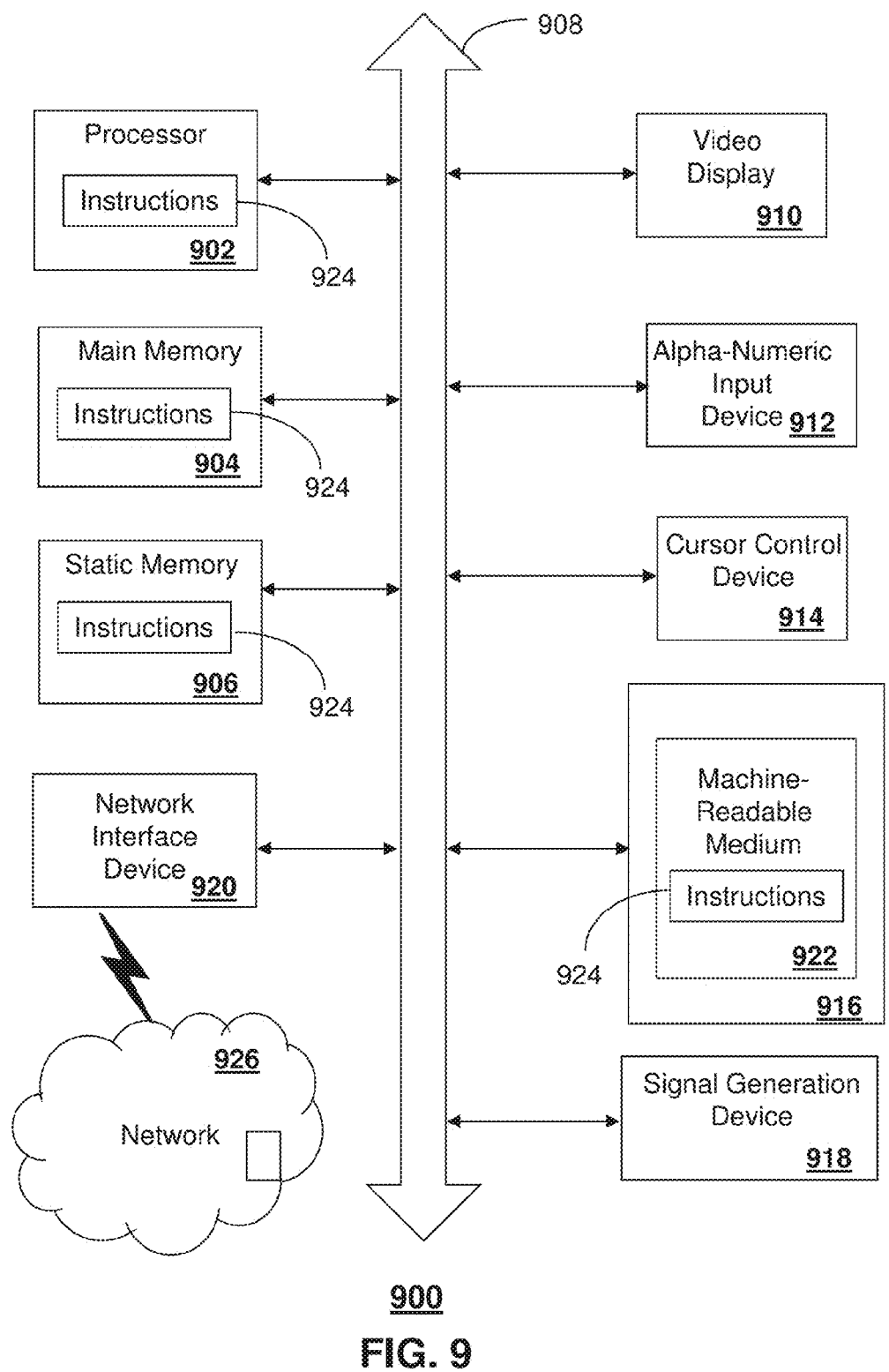
FIG. 9 is a diagrammatic representation of a machine in the form of a computer system within which a set of instructions, when executed, may cause the machine to perform any one or more of the methods described herein.

FIG. 9 depicts an exemplary diagrammatic representation of a machine in the form of a computer system 900 within which a set of instructions, when executed, may cause the machine to perform any one or more of the methods described above. One or more instances of the machine can operate, for example, as the remote management server, the N-OIF, the OTA server, the secure services platform (e.g., the UICC and/or the U-OIC), the baseband proxy, and so forth. In some embodiments, the machine may be connected (e.g., using a network 926) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 900 may include a processor (or controller) 902 (e.g., a central processing unit (CPU)), a graphics processing unit (GPU, or both), a main memory 904 and a static memory 906, which communicate with each other via a bus 908. The computer system 900 may further include a display unit 910 (e.g., a liquid crystal display (LCD), a flat panel, or a solid state display). The computer system 900 may include an input device 912 (e.g., a keyboard), a cursor control device 914 (e.g., a mouse), a disk drive unit 916, a signal generation device 918 (e.g., a speaker or remote control) and a network interface device 920. In distributed environments, the embodiments described in the subject disclosure can be adapted to utilize multiple display units 910 controlled by two or more computer systems 900. In this configuration, presentations described by the subject disclosure may in part be shown in a first of the display units 910, while the remaining portion is presented in a second of the display units 910.

The disk drive unit 916 may include a tangible computer-readable storage medium 922 on which is stored one or more sets of instructions (e.g., software 924) embodying any one or more of the methods or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 922 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "separate" can include a component or device that is logically and/or physically separate from another component or device, which can include components/devices that operate independently of each other while being in communication with each other. In one or more embodiments, devices can be separate in that they do not share any common component (although such separate devices can be in communication with each other such as via an electrode coupling. In one or more embodiments, devices can be separate in that they each have one or more components that are not shared between each other but have one or more components that may be shared with each other.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP, NFC) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee, NFC), and long-range communications (e.g., WiMAX, GSM, CDMA, LTE) can be used by computer system 900.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described). Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
   a first processor; and
   a memory that stores executable instructions that, when executed by the first processor, facilitate performance of operations comprising:
   receiving, from a network interworking function operating in a server, an over-the-air programming message utilizing a hypertext transfer protocol, the over-the-air programming message including programming data for use by the device;
   converting the over-the-air programming message to a short message service transport protocol to generate an adjusted message that includes the programming data; and
   providing the adjusted message to a universal integrated circuit card of the device via a second processor of the device, wherein the first processor, the universal integrated circuit card and the second processor are separate from each other and are in communication with each other,
   wherein the over-the-air programming message is one of a group of over-the-air programming messages from a group of over-the-air programming servers, and
   wherein the network interworking function determines a priority among the group of over-the-air programming messages, wherein the priority is utilized for determining a transmission schedule for the group of over-the-air programming messages.

2. The device of claim 1, wherein the device comprises a mobile communication device, and wherein the first processor is a secure device processor coupled to the universal integrated circuit card to form a secure services platform of the mobile communication device.

3. The device of claim 1, wherein the first processor executes a user interworking function to exchange messages with the universal integrated circuit card.

4. The device of claim 3, wherein the operations further comprise:
   registering an internet protocol address with the network interworking function, the internet protocol address being associated with the user interworking function, wherein the registering of the internet protocol address is based on a mutual authentication of the network interworking function and the user interworking function utilizing a first keyset that is provided to the user interworking function and the network interworking function by a remote management server.

5. The device of claim 4, wherein the first keyset is provided to the user interworking function utilizing a remote management keyset.

6. The device of claim 3, wherein the operations further comprise:
   receiving a response from the universal integrated circuit card, the response being associated with the adjusted message,
   converting the response to the hypertext transfer protocol to generate an adjusted response; and
   encrypting the response utilizing a first keyset that is provided to the user interworking function and the network interworking function by a remote management server, wherein the encrypting is performed prior to the generating of the adjusted response.

7. The device of claim 3, wherein the operations further comprise decrypting the over-the-air programming message utilizing a first keyset that is provided to the user interworking function and the network interworking function by a remote management server, wherein the decrypting is performed prior to the generating of the adjusted message.

8. The device of claim 1, wherein the adjusted message is provided via a baseband proxy operating in the second processor of the device.

9. The device of claim 8, wherein the operations further comprise authenticating with the baseband proxy prior to the providing of the adjusted message to the universal integrated circuit card, wherein the authenticating with the baseband proxy is based on a second keyset.

10. The device of claim 8, wherein the operations further comprise:
    receiving a response that is utilizing the short message service transport protocol, the response being received from the universal integrated circuit card, the response being associated with the adjusted message provided to the universal integrated circuit card, the response being received from the universal integrated circuit card via the baseband proxy;
    converting the response to the hypertext transfer protocol to generate an adjusted response; and
    providing the adjusted response to the network interworking function.

11. A method comprising:
    receiving, by a device comprising a first processor, from a network interworking function operating in a server, an over-the-air programming message utilizing a hypertext transfer protocol, the over-the-air programming message including programming data for use by the device;
    converting, by the device, the over-the-air programming message to a short message service transport protocol to generate an adjusted message that includes the programming data; and
    providing, by the device, the adjusted message to a universal integrated circuit card of the device via a baseband proxy operating in a second processor of the device, wherein the first processor, the universal integrated circuit card and the second processor are separate from each other and are in communication with each other,
    wherein the over-the-air programming message is one of a group of over-the-air programming messages from a group of over-the-air programming servers, and
    wherein the network interworking function determines a priority among the group of over-the-air programming messages, wherein the priority is utilized for determining a transmission schedule for the group of over-the-air programming messages.

12. The method of claim 11, wherein the device comprises a mobile communication device, and wherein the first processor is a secure device processor coupled to the universal integrated circuit card to form a secure services platform of the mobile communication device.

13. The method of claim 11, wherein the first processor executes a user interworking function to exchange messages with the universal integrated circuit card.

14. The method of claim 13, further comprising:
    registering an internet protocol address with the network interworking function, the internet protocol address being associated with the user interworking function, wherein the registering of the internet protocol address is based on a mutual authentication of the network interworking function and the user interworking function utilizing a first keyset that is provided to the user interworking function and the network interworking function by a remote management server.

15. The method of claim 11, further comprising:
receiving a response that is utilizing the short message service transport protocol, the response being received from the universal integrated circuit card, the response being associated with the adjusted message provided to the universal integrated circuit card, the response being received from the universal integrated circuit card via the baseband proxy;
converting the response to the hypertext transfer protocol to generate an adjusted response; and
providing the adjusted response to the network interworking function.

16. The method of claim 11, further comprising:
authenticating with the baseband proxy prior to the providing of the adjusted message to the universal integrated circuit card, wherein the authenticating with the baseband proxy is based on a second keyset.

17. A machine readable storage device comprising instructions which, responsive to being executed by a user interworking function of a first processor of a communication device, cause the user interworking function to perform operations comprising:
receiving from a network interworking function operating in a server, an over-the-air programming message utilizing a hypertext transfer protocol, the over-the-air programming message including programming data for use by the communication device;
converting the over-the-air programming message to a short message service transport protocol to generate an adjusted message that includes the programming data; and
providing the adjusted message to a universal integrated circuit card of the communication device,
wherein the over-the-air programming message is one of a group of over-the-air programming messages from a group of over-the-air programming servers, and
wherein the network interworking function determines a priority among the group of over-the-air programming messages, wherein the priority is utilized for determining a transmission schedule for the group of over-the-air programming messages.

18. The machine readable storage device of claim 17, wherein the operations further comprise:
registering an internet protocol address with the network interworking function, the internet protocol address being associated with the user interworking function, wherein the registering of the internet protocol address is based on a mutual authentication of the network interworking function and the user interworking function utilizing a keyset that is provided to the user interworking function and the network interworking function by a remote management server.

19. The machine readable storage device of claim 17, wherein the adjusted message is provided via a second processor of the communication device, and wherein the first processor, the universal integrated circuit card and the second processor are separate from each other and are in communication with each other.

20. The machine readable storage device of claim 19, wherein the adjusted message is provided via a baseband proxy operating in the second processor of the communication device, and wherein the operations further comprise:
receiving a response that is utilizing the short message service transport protocol, the response being received from the universal integrated circuit card, the response being associated with the adjusted message provided to the universal integrated circuit card, the response being received from the universal integrated circuit card via the baseband proxy;
converting the response to the hypertext transfer protocol to generate an adjusted response; and
providing the adjusted response to the network interworking function.

* * * * *